(12) United States Patent
Verdier et al.

(10) Patent No.: US 11,065,980 B2
(45) Date of Patent: Jul. 20, 2021

(54) METHOD FOR CONTROLLING A DC-DC CONVERTER IN A MOTOR VEHICLE ELECTRICAL SYSTEM

(71) Applicants: CONTINENTAL AUTOMOTIVE FRANCE, Toulouse (FR); CONTINENTAL AUTOMOTIVE GMBH, Hanovre (DE)

(72) Inventors: Damien Verdier, Toulouse (FR); Jérôme Lachaize, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/956,398

(22) PCT Filed: Dec. 18, 2018

(86) PCT No.: PCT/FR2018/053384
§ 371 (c)(1),
(2) Date: Jun. 19, 2020

(87) PCT Pub. No.: WO2019/122696
PCT Pub. Date: Jun. 27, 2019

(65) Prior Publication Data
US 2021/0086660 A1    Mar. 25, 2021

(30) Foreign Application Priority Data
Dec. 21, 2017  (FR) ........................................ 1762701

(51) Int. Cl.
*B60L 58/20*  (2019.01)
*B60L 58/12*  (2019.01)
(Continued)

(52) U.S. Cl.
CPC ............... *B60L 58/20* (2019.02); *B60L 53/22* (2019.02); *B60L 58/12* (2019.02); *H02J 7/342* (2020.01);
(Continued)

(58) Field of Classification Search
CPC .......... B60L 58/20; B60L 53/22; B60L 58/12; B60L 2210/10; H02J 7/342; H02J 2207/20; H02J 2310/48
See application file for complete search history.

(56) References Cited

U.S. PATENT DOCUMENTS

2015/0137592 A1    5/2015   Kono
2016/0264126 A1    9/2016   Ketfi-Cherif et al.
(Continued)

FOREIGN PATENT DOCUMENTS

DE          4422256 A1      1/1996
DE     102012216004 A1      3/2014
(Continued)

OTHER PUBLICATIONS

International Search Report, dated May 23, 2019, from corresponding PCT application No. PCT/FR2018/053384.

*Primary Examiner* — Jared Fureman
*Assistant Examiner* — Duc M Pham
(74) *Attorney, Agent, or Firm* — Nixon & Vanderhye

(57) ABSTRACT

Disclosed is a method for controlling a DC current converter present in an on-board network of a motor vehicle including a service battery, the on-board network being connected, via the converter, to a traction battery that supplies power to a traction network with inverter and electric machine. When a transmission of power transients from the on-board network to the traction network leading to instabilities in the traction network is detected, an auxiliary mode of control of the converter is implemented with a limit on the current output (Continued)

from the converter depending on a state of charge of the service battery, the current limit increasing as the charge of the service battery decreases.

20 Claims, 3 Drawing Sheets

(51) Int. Cl.
*H02J 7/34* (2006.01)
*B60L 53/22* (2019.01)

(52) U.S. Cl.
CPC ....... *B60L 2210/10* (2013.01); *H02J 2207/20* (2020.01); *H02J 2310/48* (2020.01)

(56) References Cited

U.S. PATENT DOCUMENTS

| | | | |
|---|---|---|---|
| 2017/0144556 A1* | 5/2017 | Kim | B60L 58/20 |
| 2017/0170719 A1* | 6/2017 | Bang | B60L 58/20 |
| 2017/0259686 A1* | 9/2017 | Lee | B60L 58/12 |
| 2017/0259688 A1* | 9/2017 | Lee | H01M 10/44 |
| 2017/0282902 A1* | 10/2017 | Kraska | B60L 58/12 |
| 2018/0335007 A1* | 11/2018 | Shields | B60L 50/13 |

FOREIGN PATENT DOCUMENTS

| | | | |
|---|---|---|---|
| DE | 102015007585 A1 | 12/2016 | |
| DE | 102016212111 A1 | 6/2017 | |
| FR | 3014803 A1 | 6/2015 | |

* cited by examiner

METHOD FOR CONTROLLING A DC-DC CONVERTER IN A MOTOR VEHICLE ELECTRICAL SYSTEM

BACKGROUND OF THE INVENTION

Field of the Invention

The present invention relates to a method for controlling a DC/DC current converter present in an on-board network of a motor vehicle comprising a service battery. The low- or medium-voltage on-board network is connected, via the converter, to a traction battery that supplies power to a high-voltage traction network equipped with an inverter and with a traction electric machine. The inverter is controlled using a voltage or torque setpoint in accordance with at least one nominal mode.

Description of the Related Art

FIG. 1 illustrates an electric motor vehicle comprising a traction battery 1. The thick black lines represent the traction network 3 while the thinner black lines represent the on-board network 2.

The vehicle includes an electric traction motor 4 for driving the vehicle and an inverter 5, which may be inserted between the electric traction motor 4 and the traction battery 1 in the traction network 3. The traction network 3 may supply power to auxiliary elements 9, such as an air-conditioning or heating system, an air compressor, etc. The traction network 3 also comprises a charger 10 for the traction battery 1 which is connected to a charging point external to the motor vehicle. A local controller area network (CAN) 11 connects multiple intercommunicating computers to one and the same cable.

The electric traction motor 4 requires a high-voltage power supply while the on-board network 2 requires a generally low- or medium-voltage power supply. The traction battery 1 therefore supplies the on-board network 2 with power by first going through a voltage step-down DC-to-DC converter 6, or DC/DC converter. Specifically, the voltage of the traction battery 1 may be between 48 and 400 volts while the voltage of the on-board network may be between 12 and 24 volts. However, this is not limiting.

In the on-board network 2, equipment or consuming elements such as computers, including that of an electronic control unit (ECU) 7, which is on board the motor vehicle to control or monitor various control units, are connected. The electronic control unit 7 may contain, for example, a vehicle supervisor, which manages in particular a battery management system for limiting the voltage in the on-board network 2 if this voltage overshoots a preset limit.

The on-board network 2 also comprises multimedia equipment such as a car radio, various electric actuators such as those for the wipers, the window lifts, etc., light sources and a low-voltage battery or service battery 8, for example a 12-volt battery for an on-board network 2 at this voltage.

Every electric or hybrid motor vehicle is fitted both with a battery management system that manages the traction battery and with a vehicle supervisor that manages the control of the battery management system in an on-board network.

In a hybrid vehicle, the on-board network is supplied with electrical power via the traction network. The input of the DC converter is connected to the traction network and converts the high-voltage current of the traction network into a medium- or low-voltage current for the on-board network.

FIG. 2 shows an electrical network in a hybrid or electric motor vehicle. The electrical network comprises a traction battery 1 that supplies power to a high-voltage traction network 3 that is equipped with an inverter 5 and with a traction electric machine 4.

A system 12 for managing the traction battery 1 comprises a pre-charging branch 13a in parallel with a positive branch 13b connecting the positive pole + of the traction battery 1 to the positive branch of the traction network 3. A negative branch 13c connects the negative pole − of the traction battery 1 to the negative branch of the traction network 3. All the branches 13a to 13c of the system 12 for managing the traction battery are equipped with an on/off switch 15 and the pre-charging branch 13a comprises an electrical resistor 14.

The low- or medium-voltage on-board network 2 is connected, via a DC/DC current converter 6, to the traction battery 1 in parallel with the inverter 5 and with the electric machine 4 of the traction network 3. At the output of the converter 6, the on-board network 2 divides into a first branch 2a comprising a service battery 8 and a sensor 16 that measures the charge of the service battery 8, and a second branch 2b, in parallel with the first branch 2a, comprising one or more consuming elements 7a. The inverter 5 and the converter 6 are controlled by an electronic control unit that may form part of the consuming elements 7a.

In a conventional control mode, the converter between the traction network of the vehicle and the on-board network is controlled in three modes. In the first mode, which is referred to as the recharge mode, the service battery is recharged at a constant voltage, typically 14.5 volts. In the second mode, which is referred to as the zero-current mode, it is ensured that the service battery sees no current and that the power transferred by the converter is delivered only to the consuming elements in the on-board network. In the third mode, which is referred to as the cut-off mode, the converter is controlled so that power transfer does not occur.

Taking the specific case of limitation of the range of charge and discharge of the traction battery, the currents flowing into and out of this battery must be precisely controlled while guaranteeing a balance point for the charge of the service battery.

In a conventional or nominal mode of control of the converter connecting the traction network to the on-board network, power transients in the on-board network may have an effect on the traction network. These power transients are problematic when precise control of the currents entering into and exiting from the traction battery is required by the system, in particular in degraded mode or when it is very cold and when it is required for there to be no jumps in torques at the input of the electric machine. In addition, such a mode does not allow an energy balance to be ensured in the on-board network.

A voltage inverter, which operates under the control of pulses (in particular via pulse width modulation) in a control mode most frequently based on voltage but able to be based on current, is placed upstream of the electric machine. In the case where the control mode of the inverter is voltage-based, this mode is less reactive than that of the converter and power variations in the on-board network are transmitted without attenuation to the traction network, leading to instabilities in the traction network, this possibly causing the electric machine to see large jumps in power.

SUMMARY OF THE INVENTION

The problem behind the present invention, for a motor-vehicle electrical network comprising, on the one hand, a traction electrical network incorporating a traction battery and an electric machine and, on the other hand, an on-board electrical network connected to the traction network by a DC current converter, the on-board network comprising a service battery and supplying power to one or more consuming elements, is that of decreasing the propagation of the dynamics of the on-board network to the traction network while providing for the service battery as regards its charge and its discharge.

To this end, the present invention relates to a method for controlling a DC/DC current converter present in an on-board network of a motor vehicle comprising a service battery, the low- or medium-voltage on-board network being connected, via the converter, to a traction battery that supplies power to a high-voltage traction network equipped with an inverter and with a traction electric machine, the inverter being controlled, when controlled, using a voltage or torque setpoint in accordance with at least one nominal mode, characterized in that when a transmission of power transients from the on-board network to the traction network leading to instabilities in the traction network, such as power transients leading to a decrease or a significant increase in the voltage across the terminals of the traction electric machine, these decreases or increases possibly overshooting a minimum voltage and a maximum voltage of operation of the traction electric machine, respectively, is detected, an auxiliary mode of control of the converter is implemented with a limit on the current output from the converter, this current limit being dependent on a state of charge of the service battery, the current limit increasing as the charge of the service battery decreases.

By power transients leading to instabilities in the traction network, what is meant is power transients leading to a decrease or a significant increase in the voltage across the terminals of the electric machine and that may be detected, these decreases or increases possibly overshooting a minimum voltage and a maximum voltage of operation of the electric machine, respectively, in which case the electric machine may be deactivated. These power transients leading to instabilities may also result in abrupt variations in the torque of the electric machine and that may be detected, in particular but not only at low rpm.

In one particular nonlimiting case, when a traction battery is deactivated, even temporarily, the electric machine will act as a generator and may then experience abrupt voltage variations, which are to be avoided.

Lastly, during power transients leading to instabilities, the voltage in the traction network may drop below a minimum voltage, causing deactivation of the converter and of the entire traction network.

The technical effect is to suspend a nominal mode employed up to then and to replace it with a mode involving a limit on the current, in the on-board network, output from the DC current converter, this limit depending on the charge that the service battery then has.

The way in which the converter is controlled is varied, this causing the electric machine to be controlled based on torque, with a view to allowing it to operate satisfactorily and to ensuring that the electric machine delivers only the power that the traction network needs for the high-voltage auxiliary power supply. The converter then acts as a quasi-constant consumer of power, this allowing power availability to be guaranteed. The power dynamics of the traction network are thus damped.

If this charge is high, for example nonlimitingly when it is higher than 60% of the maximum charge, it is possible to call upon the service battery to supply the on-board network with power and to place a relatively low limit on the current output from the converter. In contrast, if this charge is not very high or low enough to be insufficient, the relatively low limit on the current output from the converter increases as the battery discharges, in order to ensure that the on-board network is supplied with electrical power.

It is possible thereby to prevent variations in the dynamics of the on-board network from having an effect on the traction network in a way that would be detrimental to the traction network, no rapid means for attenuating variations in dynamics being present in the traction network, the inverter control being unable to ensure such protection.

When the current limit is high, for example nonlimitingly 200 amps, the service battery may recharge. Once a relatively high charge has been reached, the service battery may again start to at least partially supply power to the on-board network and the current limit may be decreased, for example reaching nonlimitingly 20 amps for a service battery approaching though not attaining its maximum charge. The method may even be suspended if this charge exceeds the maximum charge, the converter possibly temporarily no longer supplying power to the on-board network in this case.

Thus, the implementation of the method according to the invention also protects the service battery of the on-board network from excessive discharge in addition to protecting the electric machine from voltage jumps. Advantageously, when an auxiliary mode of control of the converter is implemented with a limit on the current output from the converter, a reference voltage of the converter is set to a maximum value.

The converter is then voltage controlled by setting a reference voltage value to a very high value. The converter is thus made to follow the output current limit. Specifically, a setpoint for the current output from the converter in nominal mode is compared with the output current limit required by the method according to the present invention and the minimum of the setpoint and of the limit is used. As the reference voltage of the converter is set to a maximum value, it is the output current limit that is of lowest current value and that is therefore applied to the output of the converter.

Advantageously, when an auxiliary mode of control of the converter is implemented with a limit on the current output from the converter, a reference voltage of the converter is set to a maximum value.

Advantageously, a maximum charge value and a minimum charge value of the service battery are preset. This allows an optimal operating range to be defined for the service battery and it to be used while respecting the maximum and minimum charge values. In the implementation of the method, it is recommended, if possible, not to pass above or pass below the maximum charge value and the minimum charge value, respectively.

Advantageously, a maximum current and a minimum current in the on-board network at the output of the converter are defined with, at the minimum charge value of the service battery, the current limit being equal to the maximum current and, at the maximum charge value of the service battery, the current limit being equal to the minimum current, the minimum value being defined at least equal to an average value of the current of the on-board network, which value is established in a driving cycle of the motor vehicle.

A range of variation may be specified for the values of the maximum current and maximum charge of the service battery. These ranges of variation may serve to correct errors in the evaluation of the charge of the service battery. For example, nonlimitingly, a smart battery system may comprise a charge sensor with an error of more than +/−10% to track the charge of the service battery. This is to be taken into account in the evaluation of the maximum and minimum currents.

Advantageously, the current limit is determined using a map, a curve giving the current limit as a function of the charge of the battery being produced specifically for each of the life situations identified as causing a transmission of power transients that lead to instabilities in the traction network.

Specifically, the identified life situations may be different from one another and require different current limits. For example, during a malfunction of the traction battery, the service battery will possibly be called upon more than usual and the current limit corresponding to a given charge of the service battery will then possibly be lower than a current limit for another identified life situation since the traction network will possibly be poorly placed to ensure the supply of electrical power to the on-board network.

Advantageously, a limiter of the gradient of the variation in the current limit is used. As mentioned above, it is advantageous to avoid abrupt changes in current limits since they have an effect on the traction network and no attenuation is possible in this traction network. Current-limit steps are preferably to be avoided and are advantageously replaced by ramps of a slope suitable for the addressed life situations.

Advantageously, the life situations identified as causing power transients that lead to instabilities in the traction network are a temporary defection of the traction battery due to particular exterior conditions such as an exterior temperature below 0° C. or an exterior temperature above 45° C., a permanent defection of the traction battery, and control of the inverter using a voltage setpoint, this control implying variations in electric torque in the electric machine.

By defection, what is meant is a malfunction and not necessarily complete stoppage of the operation of the traction battery. This defection may be desired for an exterior temperature that is too high, to protect the battery.

Another life situation is that in which the inverter is controlled in torque mode, with a view to obtaining a desired current in the traction battery, this not being the preferred mode of control of the inverter. Such control causes problems because management of dynamic variations in the network is insufficient. The implementation of the present invention allows such control to be stabilized and allows the inverter to be controlled in a new way, other than in voltage mode.

Another life situation, these three life situations being nonlimiting, is that in which the power of the machine is monitored during control in voltage mode, with calls on power implying oscillations in the electric torque transmitted to the electric machine being controlled to regulate the current delivered by the traction battery.

Advantageously, said at least one nominal mode is selected from, firstly, a mode in which the service battery is recharged, secondly a zero-current mode in which the service battery is supplied with no current, its charge being sufficient, the power output from the converter being transferred to one or more consuming elements in a remaining portion of the on-board network and, thirdly, a stopped mode in which the converter is controlled so that the power transferred to the on-board network is zero.

These are the three nominal modes mainly employed. The aim of these three nominal modes is to call upon the service battery as little as possible. The first mode corresponds to a recharge of the service battery, the second mode to an end of charging of the battery without use of the service battery and the third mode to a use of the service battery with an on-board network isolated from the traction network.

The invention also relates to an electrical network in a hybrid or electric motor vehicle, the electrical network comprising a traction battery that supplies power to a high-voltage traction network equipped with an inverter and with a traction electric machine and a low- or medium-voltage on-board network connected, via a DC/DC current converter, to the traction battery in parallel with the traction network, the on-board network at the output of the converter dividing into a first branch comprising a service battery and a second branch comprising one or more consuming elements, the inverter and the converter being controlled by an electronic control unit, noteworthy in that the electronic control unit comprises means for implementing such a control method, the control unit comprising means for recognizing at least one of the life situations identified as causing power transients that lead to instabilities in the traction network, such as power transients leading to a decrease or a significant increase in the voltage across the terminals of the traction electric machine, these decreases or increases possibly overshooting a minimum voltage and a maximum voltage of operation of the traction electric machine, respectively, the on-board network comprising means for estimating the charge of the service battery, these means communicating at least to the electronic control unit.

The method according to the present invention is implemented purely with software and above all concerns the electronic control unit and therefore does not require new elements such as sensors to be added.

Advantageously, the first branch incorporates a charge sensor by way of means for estimating the charge of the service battery. This charge sensor was already present in an on-board network according to the prior art, this resulting in a saving as regards the means employed.

BRIEF DESCRIPTION OF THE DRAWINGS

Other features, aims and advantages of the present invention will become apparent on reading the detailed description that follows and on examining the appended drawings given by way of nonlimiting examples, and in which.

DESCRIPTION OF THE PREFERRED EMBODIMENTS

Figure 1:
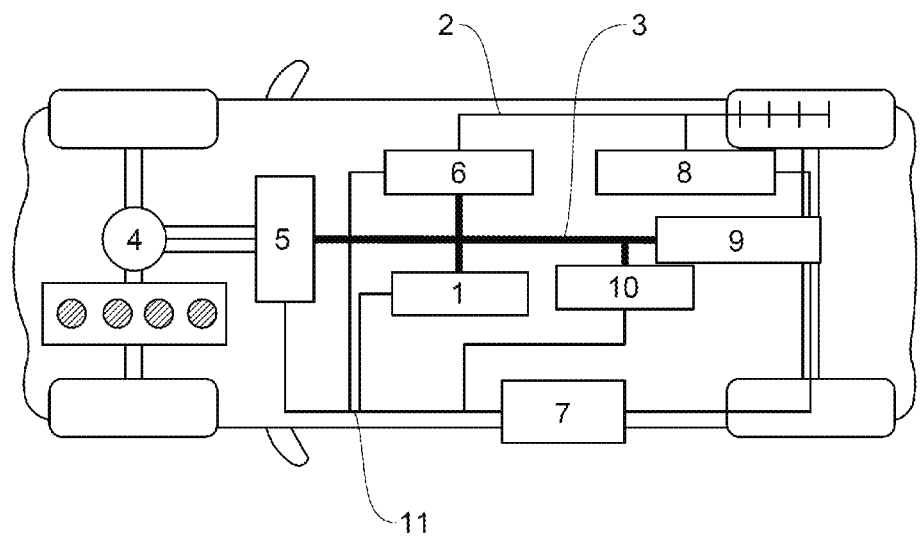
FIG. 1 is a schematic representation of an electric motor vehicle comprising a traction battery that supplies power, on the one hand, to a high-voltage network and, on the other hand, to an on-board network in the motor vehicle, the method for controlling a converter forming the link between on-board and traction networks according to the present invention being able to be implemented in such a motor vehicle.

With reference to all the figures and more particularly to FIGS. 2, 3a, 3b, 4a and 4b, the present invention relates to a method for controlling a DC/DC current converter 6 present in an on-board network 2 of a motor vehicle comprising a service battery 8. The low- or medium-voltage on-board network 2 is connected, via the converter 6, to a traction battery 1 that supplies power to a high-voltage traction network 3 equipped with an inverter 5 and with a traction electric machine 4.

As is known, the inverter 5 is controlled using a voltage setpoint, or in other words by voltage control, or using a torque setpoint, or in other words by torque control, depending at least on a nominal mode corresponding to one or more standard modes of operation of the electrical network.

According to the invention, with reference more particularly to FIGS. 3a, 3b, 4a and 4b, life situations identified as causing a transmission of power transients, from the on-board network 2 to the high-voltage traction network 3, that lead to instabilities in the traction network 3, are detected, and, when such life situations are detected, the nominal mode is completed with an auxiliary mode of control of the converter 6, which is implemented with a limit LIM I on the current output from the converter 6.

When an auxiliary mode of control of the converter 6 is implemented with a limit LIM I on the current output from the converter 6, a reference voltage of the converter 6 may be set to a maximum value. This value may for example be 15.5 volts. This current limit LIM I is dependent on a state of charge of the service battery 8, the current limit LIM I increasing as the charge of the service battery 8 decreases.

Figure 3A:
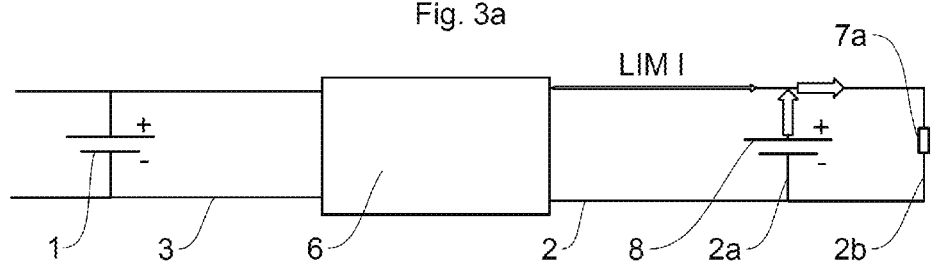
FIG. 3a is a schematic representation of an embodiment of the implementation of a method for controlling a converter forming the link between on-board and traction networks according to the present invention, the current output from the converter being bounded by a current limit, which is low in FIG. 3a, and which is determined depending on the charge of the service battery, the service battery also supplying power to the on-board network, in addition to the low current coming from the converter.
Figure 3B:
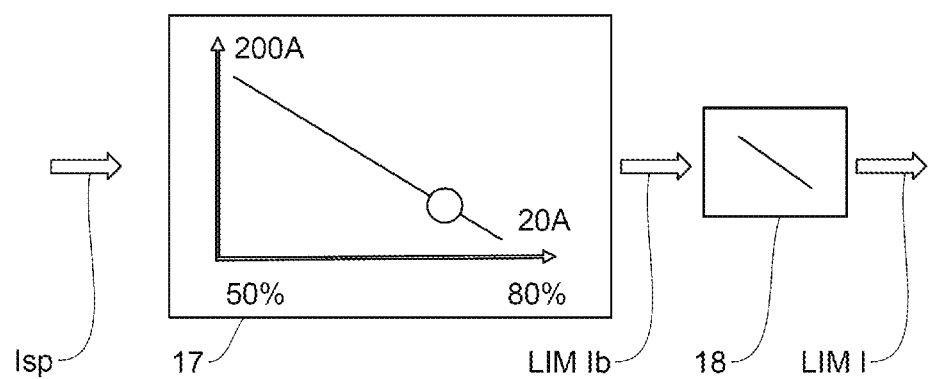
FIG. 3b is a schematic representation of the embodiment of FIG. 3a with use of a limiter of the gradient of the variation in the current limit for a current limit that is here low.
Figure 4A:
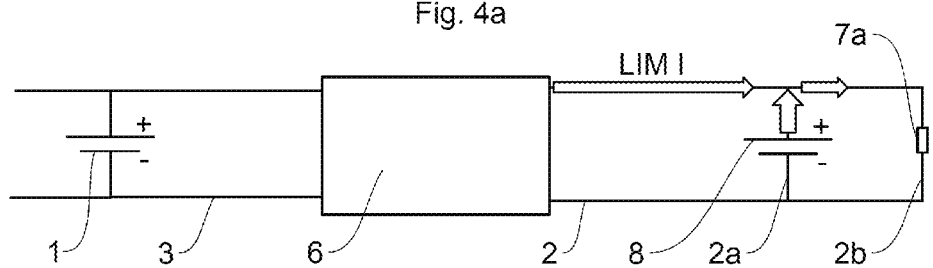
FIG. 4a is a schematic representation of an embodiment of the implementation of a method for controlling a converter forming the link between on-board and traction networks according to the present invention, the current output from the converter being bounded by a current limit, which is relatively high in FIG. 4a, and which is determined depending on the charge of the service battery, the service battery being charged by a current derived from the high current coming from the converter.
Figure 4B:
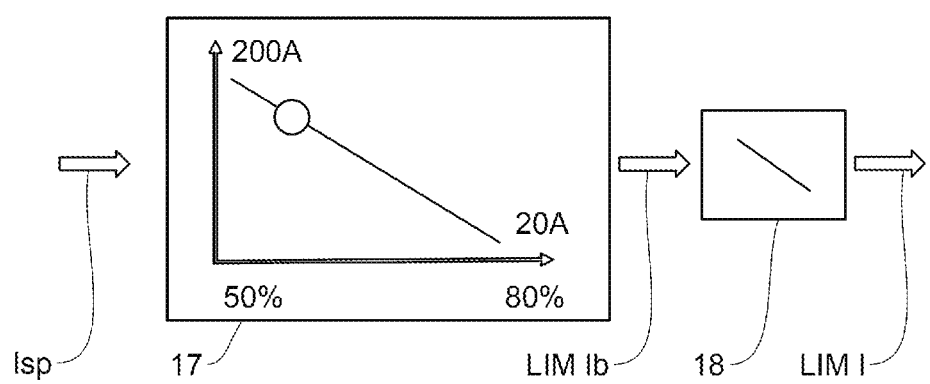
FIG. 4b is a schematic representation of the embodiment of FIG. 4a with use of a limiter of the gradient of the variation in the current limit for a current limit that is here relatively high.

FIGS. 3b and 4b show a module for computing a current limit LIM Ib depending on the charge of the service battery 8. FIGS. 3b and 4b respectively show a current limit symbolized by a circle encircling one segment of curve, which limit is respectively relatively low in FIG. 3b and high in FIG. 4b, it being, nonlimitingly, from 20 to 200 amps depending on a charge of the service battery 8, which may vary from 50 to 80%.

The values of 50 to 80% may respectively represent a value of the minimum charge and a value of the maximum charge of the service battery 8 not to be passed below and above, respectively, in order to protect the service battery 8 while discharging or charging but also to keep a margin of safety as to the charge of the service battery 8 for the minimum charge value.

A maximum current and a minimum current in the on-board network 2 at the output of the converter 6 may be defined. In FIGS. 3b and 4b, the maximum current value is 200 amps and 20 amps, respectively. The minimum current value may be defined at least equal to an average current value of the on-board network, which value is established in a driving cycle of the motor vehicle.

At the minimum charge value of the service battery 8, 50% for example, the current limit LIM I may be equal to the maximum current, 200 amps for example, and may take into account errors in the evaluation of the charge in order not to over-discharge the service battery 8.

At the maximum charge value of the service battery 8, 80% for example, the current limit LIM I may be equal to the minimum current, 20 amps for example.

Between these two maximum and minimum current values, the current limit LIM I follows a drawn curve of the current limit LIM I as a function of charge as shown in the module 17, which illustrates a map of current limit as a function of the charge of the battery.

As shown in FIGS. 3b and 4b, from a current setpoint Isp given by a control mode according to the prior art, a current limit LIM Ib is determined. This current limit LIM Ib is a raw current limit that is uncorrected but that may be depending on its gradient of variation to then give the current limit LIM I. The current limit LIM Ib may be determined using a map 17 in the module for computing the current limit LIM Ib depending on the charge of the service battery 8. The correction depending on the correction gradient is carried out in the module 18.

In FIGS. 3a and 4a, the limit designated by the reference LIM I may also be the raw current limit referenced LIM Ib in FIGS. 3b and 4b, when no correction has been applied to the raw current limit LIM Ib, because this correction is not essential but merely preferred.

The curve giving the raw current limit LIM Ib as a function of the charge of the battery may be generated specifically for each of the life situations identified as causing a transmission of power transients, from the on-board network to the traction network, that lead to instabilities in the traction network, each identified life situation requiring one specific solution.

The variation in the raw current limit LIM Ib may be curved instead of straight as in FIGS. 3b and 4b, and may for example form an open-topped shape. The curve may feature a plateau for average charges of the service battery 8, for which charges the raw current limit LIM Ib may not vary greatly.

For a low current limit LIM I, as shown in FIGS. 3a and 3b, a low current passes into the on-board network 2 from the converter 6 and most of the current supplying power to the second branch 2b, which contains one or more consuming elements 7a, comes from the service battery 8, which supplies power to the second branch 2b via the first branch 2a.

For a high current limit LIM I, as shown in FIGS. 4a and 4b, a high current passes into the on-board network 2 from the converter 6. This high current supplies power to the first branch 2a to recharge the service battery 8 and to the second branch 2b to supply power to one or more consuming elements 7a.

As in particular shown in FIGS. 3b and 4b, a limiter 18 of the gradient of the variation in the current limit LIM I may be used at the output of the map 17 for estimating the raw current limit LIM Ib depending on the charge of the service battery 8. This gradient limiter 18 makes it possible to prevent excessively abrupt variations in the current limit LIM I that could have an effect on the traction network 3 and the electric machine 4, such an effect being precisely what it is sought to avoid in the context of the present invention.

Figure 5:
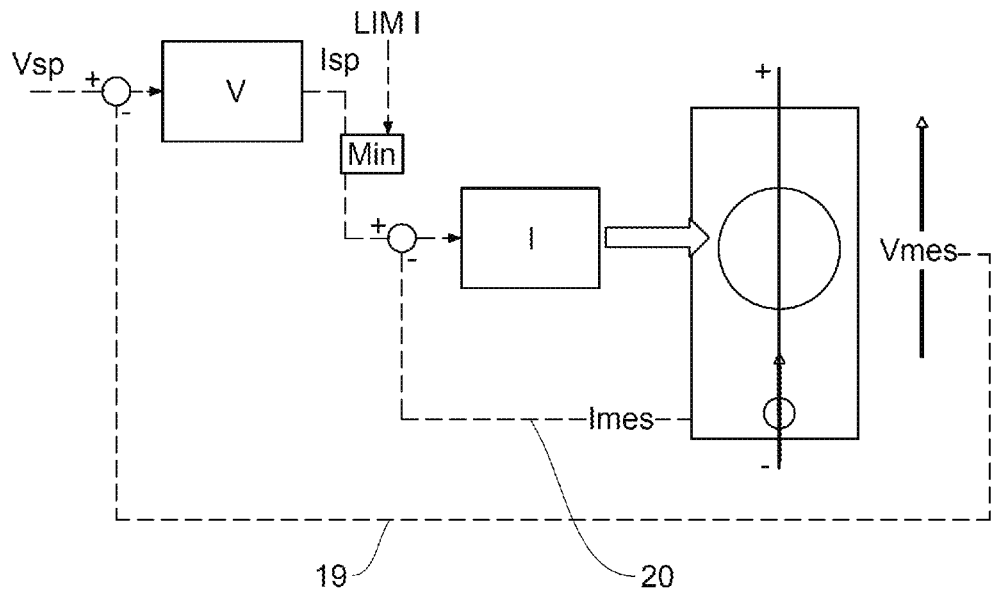
FIG. 5 is a schematic representation of an embodiment of the optional implementation of a method for controlling a converter forming the link between on-board and traction networks according to the present invention with representation of a voltage loop and a current loop, the current output from the converter being bounded by a current limit determined depending on the charge of the service battery as shown above in FIGS. 3b and 4b with, where appropriate, use of a limiter of the gradient of the variation in the current limit.

FIG. 5 shows one embodiment of a structure for controlling the voltage and the current inside a DC current converter. The structure comprises a voltage-regulating loop 19 and a current-regulating loop 20, this current-regulating loop being able to implement the control method according to the present invention.

From a voltage setpoint Vsp input into the control structure, a voltage-control module V delivers a current setpoint Isp into the converter. According to the invention, a current limit LIM I is compared in a comparator Min with the current setpoint Isp and the lowest current value of the two is sent to a current-control module I.

The voltage-regulating loop 19 is based on the measured output voltage Vmes, which is subtracted from the voltage setpoint Vsp before the voltage-control module V.

The current-regulating loop 20 is based on the measured output current Imes, which is subtracted from the lowest of the current limit LIM I and the current setpoint Isp before the current-control module I. The control is advantageously carried out by pulse width modulation.

The life situations identified as causing power transients that lead to instabilities in the traction network may be a temporary defection of the traction battery 1 due to particular exterior conditions such as a temperature below 0° C. or a temperature above 45° C., a permanent defection of the traction battery 1, control of the inverter 5 using a current setpoint, control of the power of the electric machine 4 in a control mode using a voltage setpoint, this power control implying variations in electric torque in the electric machine 4.

The power transients that cause problems with the stability of the traction network may also occur with a traction electric machine controlled in voltage mode with a disconnected traction battery, and also during power monitoring with the performance of the traction battery limited, the electric machine being controlled in torque mode to guarantee a sufficient current in the traction network.

Figure 6A:
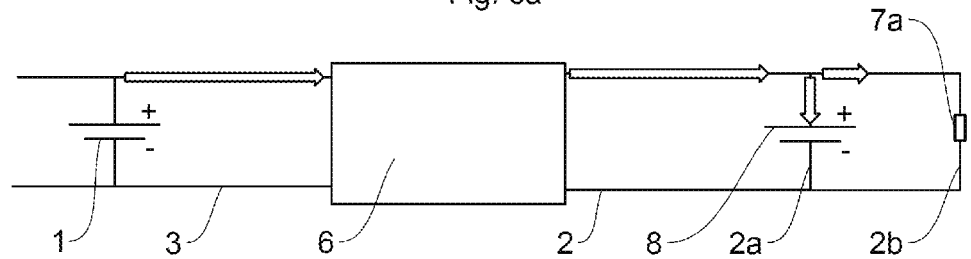
FIGS. 6a, 6b and 6c are schematic representations of a respective nominal mode according to the prior art for supplying power to an on-board network incorporating a service battery from a traction network incorporating a traction battery, an implementation of the method according to the invention correcting this nominal mode.
Figure 6B:
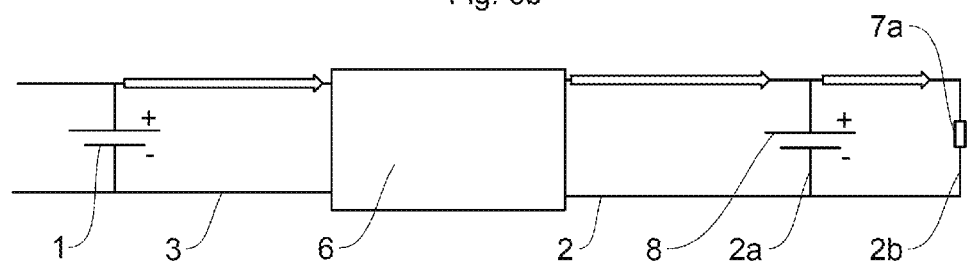
Figure 6C:
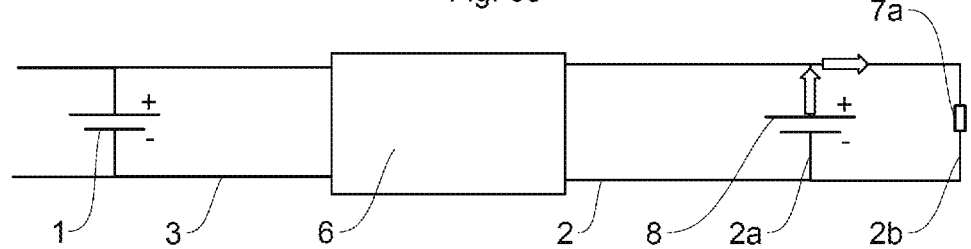

With reference more particularly to FIGS. 6a, 6b and 6c, said at least one nominal mode is selected between, firstly, a mode in which the service battery 8 is recharged. This is shown in FIG. 6a, in which the arrows indicate the direction of the current arriving, from the traction battery 1, at the converter 6 then leaving the converter 6 and splitting between a first branch 2a containing the service battery 8 and a second branch 2b comprising at least one consuming element 7a.

FIG. 6b shows a mode in which current is almost zero in the first branch 2a containing the service battery 8. The service battery 8 is supplied with no current, its charge being sufficient. All the power output from the converter 6 is transferred to one or more consuming elements 7a in the second branch 2b of the on-board network 2.

FIG. 6c shows a stopped mode in which the converter 6 is controlled so that the transfer of power in the on-board network 2 is zero. The converter 6 is not supplied with power by the traction network 3 and the service battery 8 in the first branch 2a supplies power only to the one or more consuming elements 7a present in the second branch 2b of the on-board network 2.

With reference to all the figures, the invention also relates to an electrical network in a hybrid or electric motor vehicle. The electrical network comprises a traction battery 1 that supplies power to a high-voltage traction network 3 that is equipped with an inverter 5 and with a traction electric machine 4.

The electrical network comprises a low- or medium-voltage on-board network 2 connected, via a DC/DC current converter 6, to the traction battery 1, in parallel with the traction network 3. At the output of the converter 6, the on-board network 2 divides into a first branch 2a comprising a service battery 8, and a second branch 2b comprising one or more consuming elements 7a.

In voltage-control mode, the inverter 5 and the converter 6 are controlled by an electronic control unit 7. To give a general idea, during the control, the converter 6 may have a voltage-mode response time of about 50 milliseconds whereas the inverter 5 may have a voltage-mode response time of about 100 milliseconds. It follows that the inverter 5 cannot, with such control, correct the jumps in power of the on-board network 2 and can only transmit them to the electric machine 4, with variations in the torque of the electric machine 4.

To avoid this and implement the control method according to the invention, the electronic control unit 7 comprises means for implementing such a control method, including means for recognizing at least one of the life situations identified as causing power transients that lead to instabilities in the traction network. These life situations are those described above with reference to FIGS. 6a, 6b and 6c.

The first life situation may be detected by the system 12 for managing the traction battery 1, which may comprise a sensor of the charge of the traction battery 1, which sensor is not shown for the traction battery 1 in the figures, and means for monitoring the current and/or the voltage output from the traction battery 1. The management system 12 may send this information to the electronic control unit 7.

The second life situation is recognized by the electronic control unit 7, in the mode of control depending on the current or voltage that the electronic control unit 7 applies to the system. The third life situation relating to monitoring the power of the electric machine 4 may be identified by the electronic control unit 7.

Figure 2:
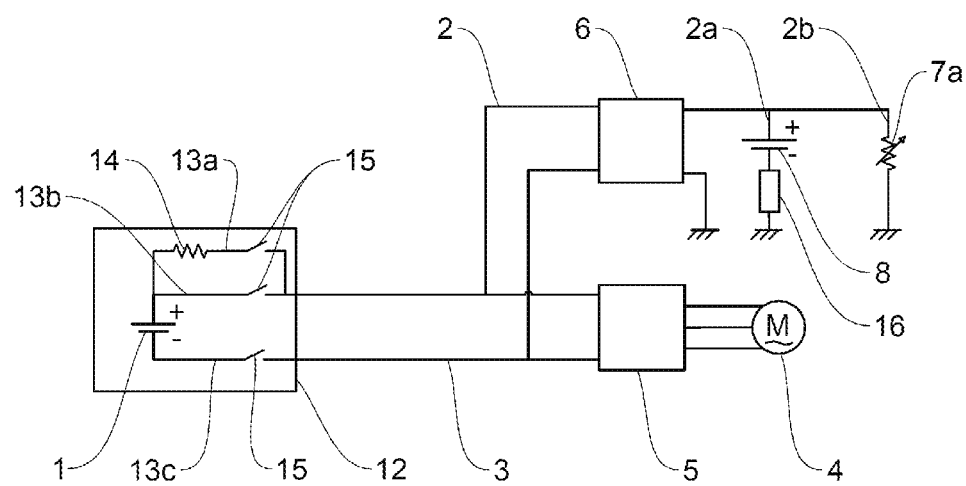
FIG. 2 is a schematic representation of an electrical network in an electric motor vehicle comprising a traction battery that supplies power, on the one hand, to a high-voltage network and, on the other hand, to an on-board network in the motor vehicle, the method for controlling a converter forming the link between on-board and traction networks according to the present invention being able to be implemented in such an electrical network.

The on-board network 2 comprises means for evaluating the charge 16 of the service battery 8, these means, which may be seen in FIG. 2, communicating at least to the electronic control unit 7. These evaluating means may take the form of a charge sensor 16 integrated into the first branch 2a of the on-board network 2 and specific to the service battery 8, or may be software-based.

The invention claimed is:

1. A method for controlling a DC/DC current converter (6) present in an on-board network (2) of a motor vehicle comprising a service battery (8), the low- or medium-voltage on-board network (2) being connected, via the converter (6), to a traction battery (1) that supplies power to a high-voltage traction network (3) equipped with an inverter (5) and with a traction electric machine (4), the inverter (5) being controlled using a voltage or torque setpoint in accordance with at least one nominal mode, wherein, when a transmission of power transients from the on-board network (2) to the traction network (3) leading to instabilities in the traction network (3), such as power transients leading to a decrease or a significant increase in the voltage across the terminals of the traction electric machine, these decreases or increases possibly overshooting a minimum voltage and a maximum voltage of operation of the traction electric machine, respectively, is detected, an auxiliary mode of control of the converter (6) is implemented with a limit (LIM I) on the current output from the converter (6), this current limit (LIM I) being dependent on a state of charge of the service battery (8), the current limit (LIM I) increasing as the charge of the service battery (8) decreases.

2. The control method as claimed in claim 1, wherein, when an auxiliary mode of control of the converter (6) is implemented with a limit (LIM I) on the current output from the converter (6), a reference voltage of the converter (6) is set to a maximum value.

3. The control method as claimed in claim 2, wherein a maximum charge value and a minimum charge value of the service battery (8) are preset.

4. The method as claimed in claim 3, wherein a maximum current and a minimum current in the on-board network (2) at the output of the converter (6) are defined with, at the minimum charge value of the service battery (8), the current limit (LIM I) being equal to the maximum current and, at the maximum charge value of the service battery (8), the current limit (LIM I) being equal to the minimum current, the minimum value being defined at least equal to an average current value of the on-board network, which value is established in a driving cycle of the motor vehicle.

5. The control method as claimed in claim 4, wherein the current limit (LIM I) is determined using a map (17), a curve giving the current limit (LIM I) as a function of the charge of the battery being produced specifically for each of the life situations identified as causing a transmission of power transients that lead to instabilities in the traction network (3).

6. The control method as claimed in claim 4, wherein a limiter (18) of the gradient of the variation in the current limit (LIM I) is used.

7. The control method as claimed in claim 4, wherein the life situations identified as causing power transients that lead to instabilities in the traction network are a temporary defection of the traction battery (1) due to particular exterior conditions, a permanent defection of the traction battery (1), and control of the inverter (5) using a voltage setpoint, this power control implying variations in electric torque in the electric machine (4).

8. The control method as claimed in claim 3, wherein the current limit (LIM I) is determined using a map (17), a curve giving the current limit (LIM I) as a function of the charge of the battery being produced specifically for each of the life situations identified as causing a transmission of power transients that lead to instabilities in the traction network (3).

9. The control method as claimed in claim 3, wherein a limiter (18) of the gradient of the variation in the current limit (LIM I) is used.

10. The control method as claimed in claim 3, wherein the life situations identified as causing power transients that lead to instabilities in the traction network are a temporary defection of the traction battery (1) due to particular exterior conditions, a permanent defection of the traction battery (1), and control of the inverter (5) using a voltage setpoint, this power control implying variations in electric torque in the electric machine (4).

11. The control method as claimed in claim 2, wherein the current limit (LIM I) is determined using a map (17), a curve giving the current limit (LIM I) as a function of the charge of the battery being produced specifically for each of the life situations identified as causing a transmission of power transients that lead to instabilities in the traction network (3).

12. The control method as claimed in claim 2, wherein a limiter (18) of the gradient of the variation in the current limit (LIM I) is used.

13. The control method as claimed in claim 2, wherein the life situations identified as causing power transients that lead to instabilities in the traction network are a temporary defection of the traction battery (1) due to particular exterior conditions, a permanent defection of the traction battery (1), and control of the inverter (5) using a voltage setpoint, this power control implying variations in electric torque in the electric machine (4).

14. The control method as claimed in claim 1, wherein the current limit (LIM I) is determined using a map (17), a curve giving the current limit (LIM I) as a function of the charge of the battery being produced specifically for each of the life situations identified as causing a transmission of power transients that lead to instabilities in the traction network (3).

15. The control method as claimed in claim 14, wherein a limiter (18) of the gradient of the variation in the current limit (LIM I) is used.

16. The control method as claimed in claim 1, wherein a limiter (18) of the gradient of the variation in the current limit (LIM I) is used.

17. The control method as claimed in claim 1, wherein the life situations identified as causing power transients that lead to instabilities in the traction network are a temporary defection of the traction battery (1) due to particular exterior conditions, a permanent defection of the traction battery (1), and control of the inverter (5) using a voltage setpoint, this power control implying variations in electric torque in the electric machine (4).

18. The control method as claimed in claim 1, wherein said at least one nominal mode is selected from, firstly, a mode in which the service battery (8) is recharged, secondly a zero-current mode in which the service battery (8) is supplied with no current, its charge being sufficient, the power output from the converter (6) being transferred to one or more consuming elements (7a) in a remainder of the on-board network (2) and, thirdly, a stopped mode in which the converter (6) is controlled so that the power transferred to the on-board network (2) is zero.

19. An electrical network in a hybrid or electric motor vehicle, the electrical network comprising a traction battery (1) that supplies power to a high-voltage traction network (3) equipped with an inverter (5) and with a traction electric machine (4) and a low- or medium-voltage on-board network (2) connected, via a DC/DC current converter (6), to the traction battery (1) in parallel with the traction network (3), the on-board network (2) at the output of the converter (6) dividing into a first branch (2a) comprising a service battery (8) and a second branch (2b) comprising one or more consuming elements (7a), the inverter (5) and the converter (6) being controlled by an electronic control unit (7), wherein the electronic control unit (7) comprises means for implementing the control method as claimed in claim 1, the control unit (7) comprising means for recognizing at least one of the life situations identified as causing power transients that lead to instabilities in the traction network, such as power transients leading to a decrease or a significant increase in the voltage across the terminals of the traction electric machine, these decreases or increases possibly overshooting a minimum voltage and a maximum voltage of operation of the traction electric machine, respectively, the on-board network (2) comprising means (16) for estimating the charge of the service battery (8), these means (16) communicating at least to the electronic control unit (7).

20. The electrical network as claimed in claim 19, wherein the first branch (2a) incorporates a charge sensor (6) by way of means (16) for estimating the charge of the service battery (8).

* * * * *